United States Patent [19]
Holm

[11] 3,796,471
[45] Mar. 12, 1974

[54] CORROSION RESISTANT ROLL & BEARING ASSEMBLY

[75] Inventor: William J. Holm, Springfield, Vt.

[73] Assignee: Riggs & Lombard, Inc., Lowell, Mass.

[22] Filed: Dec. 3, 1971

[21] Appl. No.: 204,551

[52] U.S. Cl. .................................................. 308/59
[51] Int. Cl. ........................................... F16c 35/06
[58] Field of Search ............... 308/72, 20, 58, 59; 198/208; 74/242.12, 242.14

[56] References Cited
UNITED STATES PATENTS

| | | | |
|---|---|---|---|
| 2,718,439 | 9/1955 | Glasser et al. | 308/216 |
| 2,590,675 | 3/1952 | Bottorff | 308/59 |
| 2,785,021 | 3/1957 | Whittum | 308/58 |
| 2,320,295 | 5/1943 | Patterson | 308/59 |
| 2,630,330 | 3/1953 | Long | 308/59 |

Primary Examiner—Charles J. Myhre
Assistant Examiner—Barry Grossman
Attorney, Agent, or Firm—Morse, Altman, Oates & Bello

[57] ABSTRACT

A corrosion resistant roll and bearing assembly are provided for use in equipment subject to contact with corrosive liquids and gases. The bearing assembly is of the roller type and is fabricated from stainless steel components in a self-centering configuration. The roll ends are mounted to brackets providing position adjustment means to permit alignment of the roll with respect to other rolls or the like.

1 Claim, 3 Drawing Figures

PATENTED MAR 12 1974

3,796,471

3,796,471

CORROSION RESISTANT ROLL & BEARING ASSEMBLY

BACKGROUND OF THE INVENTION

1. Field of the Invention

This invention relates generally to bearings and roll assemblies and more particularly is directed towards a bearing and roll assembly for use in a corrosive environment.

2. Description of the Prior Art

In the production of textiles and other materials, it is often necessary to pass the material through a corrosive medium. For example, many fabrics are scoured during some stage of their production to remove foreign matter present in the cloth. This scouring process is normally carried out within a tank or other enclosure provided with a number of transverse rollers which serve to support and guide the fabric through the scouring operation. The scouring medium normally is highly corrosive and conventional rolls and bearings quickly deteriorate and require frequent replacement. Heretofore, the practice has been to use sleeve-type bearings made of non-corrosive materials where the bearing is to be used in a corrosive atmosphere, or to extend the journals through the sides of the tank or other vessel in order to isolate the bearings from corrosive attack.

While sleeve-type bearings of non-corrosive materials resist damage due to the corrosive atmosphere, they result in high frictional resistance and are difficult to lubricate effectively whereby the bearing may fail from overheating or rapid wear. While the use of external bearings to support the rolls eliminates many of the problems, the technique requires the use of expensive seals or stuffing glands where the journals extend through the walls of the vessel. These seals and glands require rather frequent service to prevent leakage.

Therefore, it is an object of the present invention to provide a low-friction, roller-type bearing that may be used in a corrosive atmosphere without adverse effect on the life or operational characteristics of the bearing. Another object of this invention is to provide a self-centering corrosion resistant roll and bearing assembly for use in a corrosive atmosphere and adapted to be quickly and easily aligned.

SUMMARY OF THE INVENTION

This invention features a roll and bearing assembly for use particularly in a corrosive environment comprising a roll body of corrosion resistant material such as stainless steel and a bearing assembly of stainless steel parts rotatably supporting opposite ends of the roll axle. The bearings include a plurality of evenly spaced stainless steel rollers, cooperating inner and outer stainless steel races supporting said rollers, a stainless steel annular cage mounted to either side of said races and engaging the ends of said rollers, an annular stainless steel support engaging the outer race, said outer race being formed with a convex surface to provide a self-centering support for said bearing assembly. The bearing provides three rotating surfaces for low friction support. Guide ways are provided for the bearings to permit linear adjustment and alignment of the roll with respect to other rolls or the like.

DETAILED DESCRIPTION OF THE PREFERRED EMBODIMENT

Figure 1:
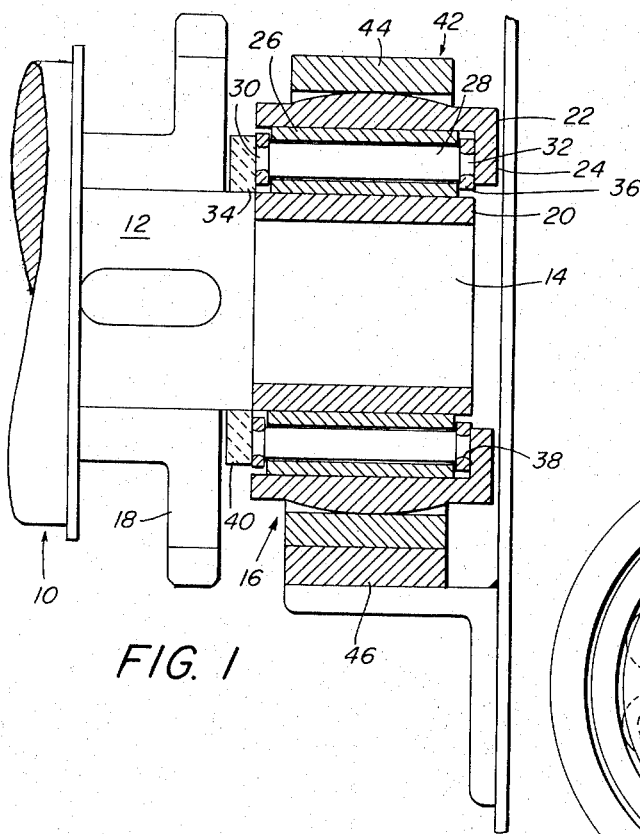
FIG. 1 is a detailed sectional view in side elevation of a roll and bearing assembly made according to the invention.
Figure 2:
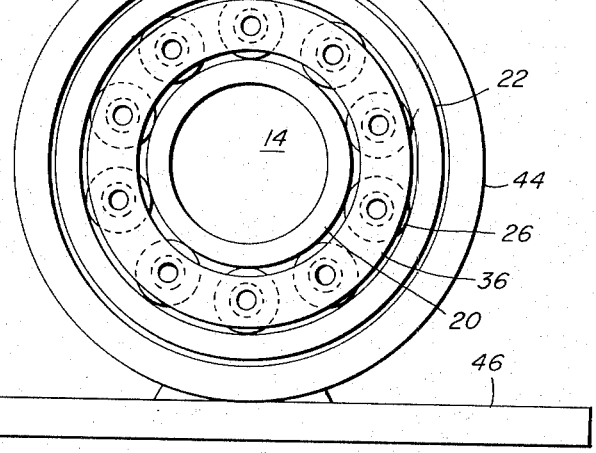
FIG. 2 is a view in end elevation thereof, and, FIG. 3 is a view in perspective, partially cut away, showing a roll and bearing assembly in a typical installation.

Referring now to the drawings, the reference character 10 generally indicates a roll carried by an axle 12 having reduced end portions 14 supported by a roller bearing assembly 16. The roll body 10 is of a corrosive resistant material, preferably stainless steel, and may be an idler roller or a driven roll in which case a sprocket gear 18 is keyed to the axle 12 to receive a chain drive from a suitable power drive.

The bearing assembly 16 is comprised of an annular inner race 20 press fitted over the reduced ends 14 of the axle 12, the inner race being fabricated from stainless steel, preferably 304 stainless steel, with the outer surface of the inner race being hardened. Coaxial with the inner race and spaced therefrom is an outer race 22, also of stainless steel and formed with an inwardly extending outer skirt or flange 24 for containing a plurality of hardened stainless steel rollers 26 disposed between the inner and outer races. Each roller 26 is relatively loosely fitted to a pin 28 of stainless steel, the pin being formed with reduced end portions 30 and 32 engaging annular cage plates 34 and 36. The cage plates are fabricated frfom stainless steel and are in the form of flat annular washers with a plurality of evenly spaced holes 38 to receive the reduced ends of the pins 28. An annular washer 40 is mounted on the axle 12 and is fitted snugly against the innermost cage plate 34 to maintain the rollers and pins in position between the races. The washer 40 in the preferred embodiment is made out of a corrosive-resistant plastic material such as nylon or teflon and is held in position either by the sprocket gear 18 or by a collar mounted in place of the sprocket gear.

The outer surface of the outer race 22 is somewhat barrel-shaped or convex as best shown in FIG. 1 and engages the inner cylindrical surface of a housing member 42 concentric with the bearing assembly. The housing member is comprised of an annulus 44 fixed to a tangential plate 46 as by welding or the like. With the exception of the washer 40 the entire bearing assembly is fabricated of stainless steel parts and therefore will not deteriorate in a corrosive environment whether in the form of a gas or liquid.

The bearing involves three rolling surfaces namely, the rollers 26 which rotate between the inner and outer races, the inner race which rotates with the axle 14 and the end cages which rotate with the pins 28 as the rollers move about within the clearance between races.

Figure 3:
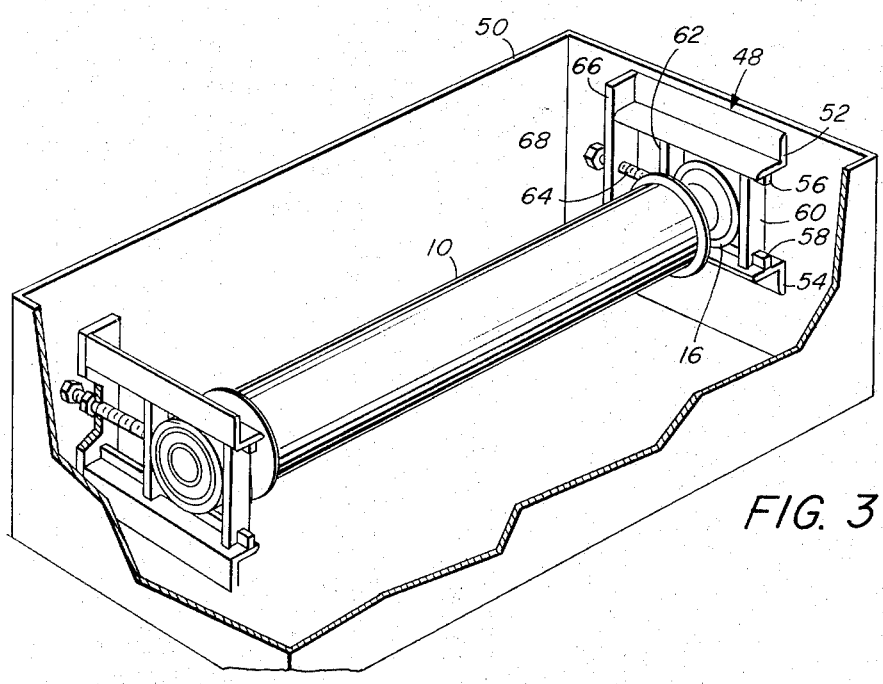

Referring now more particularly to FIG. 3 of the drawings, there is illustrated a mounting arrangement for the roll and bearing assembly to permit the adjustment and alignment of the roll. The adjustment mechanism includes a pair of brackets 48 mounted to opposite walls of a tank 50 or other vessel at either end of the roll 10. The brackets are mounted on the inside walls of the tank and each is comprised of parallel upper and lower rails 52 and 54 formed of angle stock and defining a guideway for bearing assemblies 16. Each of the rails 52 is formed with a longitudinal rib 56 and 58 facing opposite one another to slidably engage the notched ends of a pair of plates 60 and 62 fastened to either side of the bearing assembly 16. The rearmost plate 62 drivingly engages an adjustment screw 64 threaded to an end plate 66 fixed to the rails 52 and 54 perpendicularly thereto. It will be understood that rotation of the adjustment screw one way or another will move the plates 60 and 62, together with the bearing, back and forth along the guideway formed by the rails. In this fashion, the roll 10 may be aligned with other rolls or the like and, once the alignment has been set, a lock nut 68 is tightened up along the screw 64 against the wall 66. The bracket assembly 48 is fabricated from stainless steel components to provide the same corrosion resistant characteristics of the bearing assembly 16.

The roll and bearing assembly together with the adjustment mechanism is mounted wholly within the tank 50 so that there is no need of stuffing glands or the like and, in view of the stainless steel construction, the bearings and associated parts will not be adversely affected by any corrosive fluids within the tank. The roller bearing configuration provides a low friction rolling support for the roll and the configuration of the outer race provides a self-centering feature.

Having thus described the invention what I claim and desire to obtain by Letters Patent of the United States is:

1. Apparatus for use in a corrosive environment, comprising in combination
   a. a roll body of corrosion resistant material and formed with end portions,
   b. a bearing assembly fabricated with surface hardened working surfaces and rotatably engaging each of said end portions,
   c. each of said bearing assemblies including concentric stainless steel inner and outer races,
   d. a plurality of evenly spaced tubular stainless steel rollers disposed between said races,
   e. a stainless steel pin extending coaxially through each of said rollers,
   f. an annular cage plate of stainless steel at each end of said assembly and formed with spaced apertures to receive the ends of said pins
   g. said outer race being formed with an outwardly facing convex periphery and an inwardly extending annular flange, dimensioned to engage the outermost of said plates and the outer ends of said pins,
   h. a housing supporting said assembly,
   i. said housing including a concentric stainless steel annulus formed with a cylindrical inner surface engaging the convex periphery of said outer race,
   j. a corrosion resistant plastic annulus mounted over said end portions and engaging the innermost of said end plates, and,
   k. a vessel having opposing upright walls,
   l. a pair of stainless steel adjustment brackets mounted to opposing inner faces of said walls and supporting each of said bearing assemblies,
   m. each of said brackets including a pair of spaced parallel members mounted to said wall perpendicular to the axis of said roll and defining a guideway,
   n. said housing slidably mounted in said guideway, and,
   o. screw means mounted to said bracket parallel to said guideway and drivingly engaging said housing for movement along said guideway.

* * * * *